United States Patent
Hansen et al.

(10) Patent No.: US 6,202,462 B1
(45) Date of Patent: *Mar. 20, 2001

(54) METHOD OF FORMING NOISE-DAMPING MATERIAL WITH ULTRA-THIN VISCOELASTIC LAYER

(75) Inventors: Richard M. Hansen, Oshkosh, WI (US); Edward J. Vydra, Northbrook, IL (US)

(73) Assignee: Material Sciences Corporation, Elk Grove Village, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,335

(22) Filed: May 26, 1998

(51) Int. Cl.[7] ............................. B21B 27/06; B21B 13/04
(52) U.S. Cl. ......................... 72/199; 428/551; 428/625; 428/336; 156/229; 72/200
(58) Field of Search ............................. 72/200, 201, 202, 72/224, 225, 229, 234, 240, 248, 199; 428/625, 624, 626, 935, 465, 336, 551, 548; 156/242, 229

(56) References Cited

U.S. PATENT DOCUMENTS

| | | |
|---|---|---|
| 1,340,149 | 5/1920 | Browne . |
| 1,656,892 | 1/1928 | Shover . |
| 3,137,922 | 6/1964 | Schumacher . |
| 3,166,831 | 1/1965 | Keith . |
| 3,235,954 | 2/1966 | Fromson . |
| 4,285,260 | 8/1981 | Salje et al. . |
| 4,365,995 | 12/1982 | Mori . |
| 4,749,623 | * 6/1988 | Endo et al. ........................ 428/551 |
| 4,927,070 | 5/1990 | Kretchmer . |
| 5,232,785 | 8/1993 | Kita . |
| 5,256,969 | 10/1993 | Miyajima et al. . |
| 5,329,688 | 7/1994 | Arvedi et al. . |
| 5,418,073 | 5/1995 | Loth et al. . |
| 5,474,840 | 12/1995 | Landin . |
| 5,538,774 | 7/1996 | Landin et al. . |
| 5,552,209 | 9/1996 | McCutcheon . |
| 5,554,235 | 9/1996 | Noe et al. . |

* cited by examiner

Primary Examiner—Rodney A. Butler
(74) Attorney, Agent, or Firm—Seyfarth, Shaw, Fairweather & Geraldson

(57) ABSTRACT

A noise-damping composite is formed by providing a laminate of two metal layers separated by a much thinner viscoelastic layer which has an initial thickness of at least 1 mil., and then cold rolling the laminate to proportionally permanently reduce the thickness of each layer, until the thickness of the viscoelastic layer is less than 1 mil. and preferably less than 0.5 mil. The cold rolling may be through a set of adjustable rollers, and may be done in multiple passes with the rollers adjusted for each pass to further reduce the thickness. Alternatively, the laminate may be fed successively through a series of roller sets designed to successively reduce the thickness of the laminate.

15 Claims, 2 Drawing Sheets

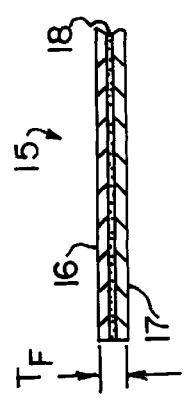
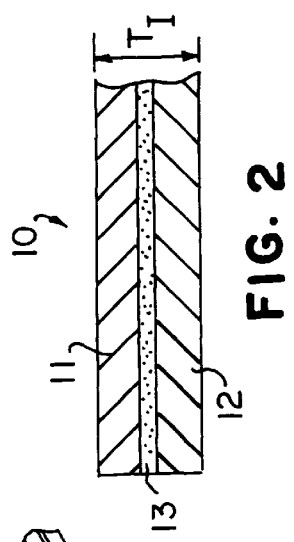
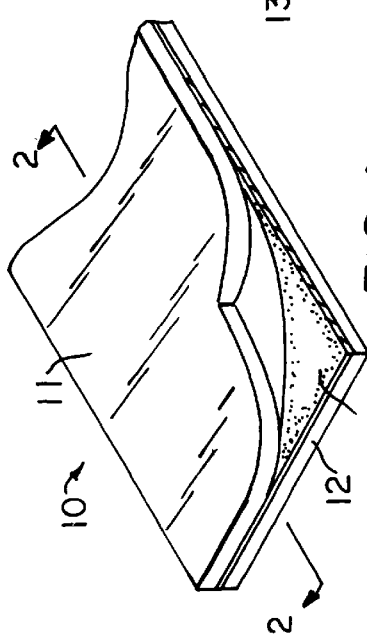
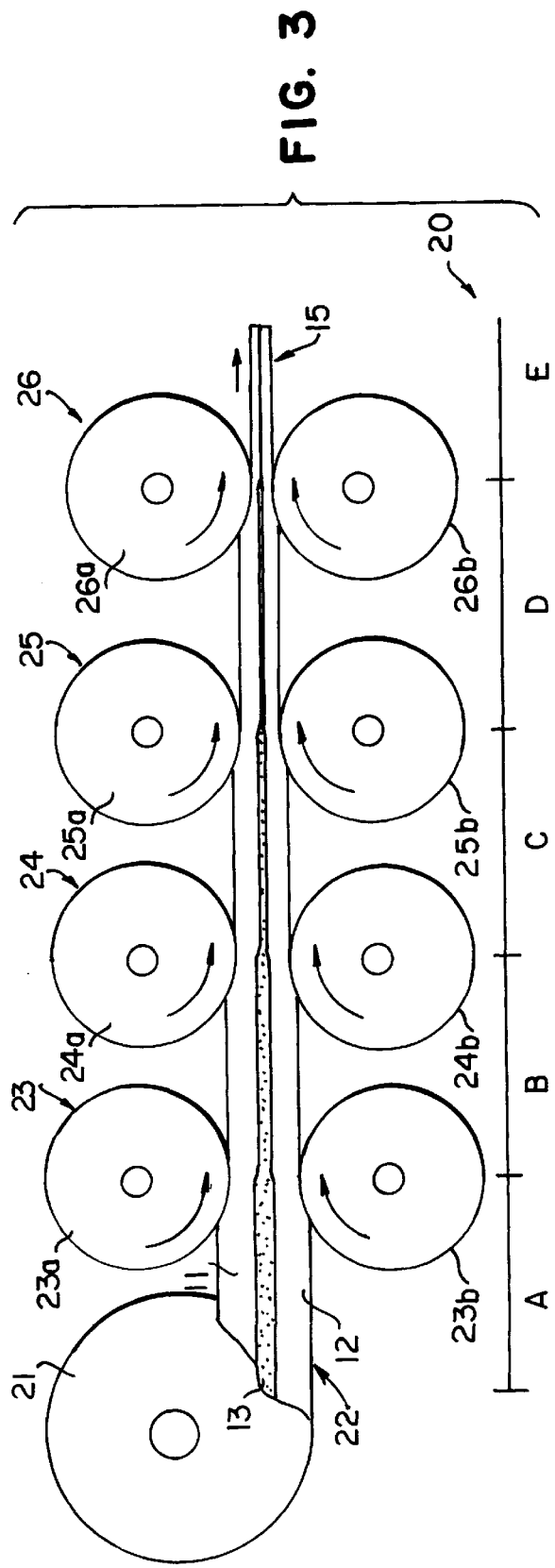

METHOD OF FORMING NOISE-DAMPING MATERIAL WITH ULTRA-THIN VISCOELASTIC LAYER

BACKGROUND OF THE INVENTION

1. Field of the Invention

The present invention relates to noise-damping composites of the type which include outer metal layers and an intermediate viscoelastic layer for sound and vibration damping characteristics. In particular, the invention relates to a method of forming such composites.

2. Description of the Prior Art

Composites with a viscoelastic layer between two metal layers have been used to attenuate noise and vibration in a number of different environments where noise is a problem, especially to diminish the propagation of structural noise and the transmission of air-borne noise. In certain applications, such as in the head arms of computer disk drives, it is desirable that the viscoelastic layer be very thin. However, the viscoelastic material not only produces sound dampening, but is also the adhesive which holds the two outer metal skins together. It is extremely difficult to apply very thin viscoelastic layers, having a thickness of a fraction of a mil., in a continuous manner.

SUMMARY OF THE INVENTION

It is a general object of the invention to provide an improved method of making noise-damping composites which avoid the disadvantages of prior techniques while affording additional operating advantages.

An important feature of the invention is the provision of a method of making a noise-damping composite which has an ultrathin layer of viscoelastic damping material, while maintaining the noise-damping and adhesive characteristics of the viscoelastic material.

This and other features of the invention may be attained by providing a method of forming a noise-damping composite comprising the steps of: providing a laminate including two metal layers separated by a viscoelastic layer with each layer having an initial thickness, and subjecting the laminate to compressive forces sufficient to permanently substantially reduce the initial thickness of each layer of the laminate.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a fragmentary perspective view of a laminate utilized in forming the noise-damping composite in accordance with the present invention;

FIG. 2 is an enlarged, fragmentary view in vertical section taken along the line 2—2 in FIG. 1;

FIG. 3 is a fragmentary side elevational view of a cold rolling assembly for rolling a web of the laminate of FIGS. 1 and 2;

FIG. 4 is a view similar to FIG. 2 of the noise-damping composite produced by cold-rolling the laminate of FIGS. 1 and 2 with the apparatus of FIG. 3;

DESCRIPTION OF THE PREFERRED EMBODIMENTS

Figure 5:
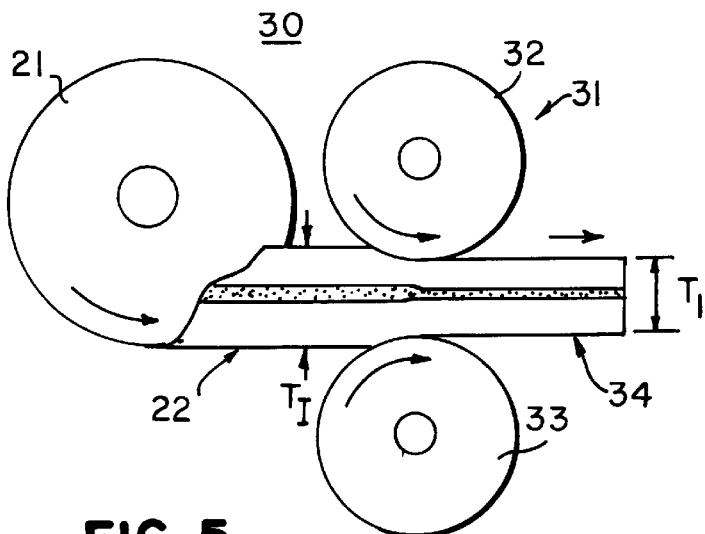
FIG. 5 is a view similar to FIG. 3 of another cold rolling apparatus of the type which can be used for forming the composite in accordance with the present invention, illustrated in a first pass configuration.

Referring to FIGS. 1 and 2, there is illustrated a noise-damping laminate of the type used in forming the composite in accordance with the present invention, the laminate 10 including outer metal layers 11 and 12 separated by a viscoelastic layer 13. The metal layers 11 and 12 may be formed of any suitable metal, such as steel, aluminum or the like, and the viscoelastic layer 13 may be formed of any suitable viscoelastic material, which serves both noise-damping and adhesive attachment functions. The laminate 10 may be of a form sold by Material Sciences Corp. under the designations "PCX-1", "PCX-3", "PCX-9" or others. Preferably, each of the outer metal layers 11 and 12 has a thickness in the range from about 0.0065 to about 0.100 inch, depending upon the intended application, and both layers may have the same thickness. The viscoelastic layer 13 preferably has a thickness of about 1 mil.

It is a fundamental aspect of the present invention that the laminate 10 is subjected to compressive forces sufficient to permanently reduce its initial thickness $T_I$ to a final thickness $T_F$, resulting in a final composite 15, illustrated in FIG. 4, having a reduced-thickness outer layers 16 and 17 and a reduced-thickness viscoelastic layer 18. Typically, the laminate outer metal layers 11 and 12 have initial thicknesses which are much greater than the initial thickness of the viscoelastic layer 13. In particular, each of the metal layers 11 and 12 may have an initial thickness 10 to 20 times that of the viscoelastic layer 13. In the method of the present invention, the thicknesses of the layers 11–13 are reduced proportionally, so that the ratio of the metal layer thickness to the viscoelastic layer thickness is the same in the final composite 15 as in the original laminate 10. By use of the method of the present invention, described in greater detail below, the initial thickness $T_I$ can be reduced anywhere from 10% to 90%. Thus, in the final composite 15, the thickness of the reduced viscoelastic layer 18 may be as small as 0.1 mil. (0.0001 inch).

Preferably, the method of the present invention is performed by cold rolling the laminate 10. Referring to FIG. 3, there is illustrated a cold rolling assembly 20 of the type which can be used for this purpose. Preferably, the laminate 10 is in the form of an elongated, continuous web 22 which is rolled on a supply coil 21, and is fed continuously through the cold rolling assembly 20. More specifically, the assembly 20 includes a plurality of roller sets, four being illustrated in FIG. 3, sufficient in number to reduce the thickness of the web 22 to the desired final thickness. Each of the roller sets 23–26 includes a pair of rollers designated by suffixes a and b, respectively, between which the web 22 is passed in a known manner, the rollers of successive sets being successively closer together to effect the desired reduction. In the preferred embodiment, each of the roller sets 23–26 applies a compressive pressure to the web sufficient to permanently deform and reduce the thickness of the web. In a preferred embodiment, each of the roller sets 23–26 can effect up to a 20% thickness reduction, although it will be appreciated that, depending upon the materials involved, other degrees of reduction per roller set could be achieved. Thus, the original web 22, in a first phase A, is fed between the rollers 23a and 23b, reducing the thickness to a phase B, which is fed between the rollers 24a and 24b to reduce the thickness further to a phase C, which is fed between the rollers 25a and 25b to further reduce the thickness to a phase D, which is fed between the rollers 26a and 26b to finally reduce the thickness to the final composite 15 in a phase E.

Figure 6:
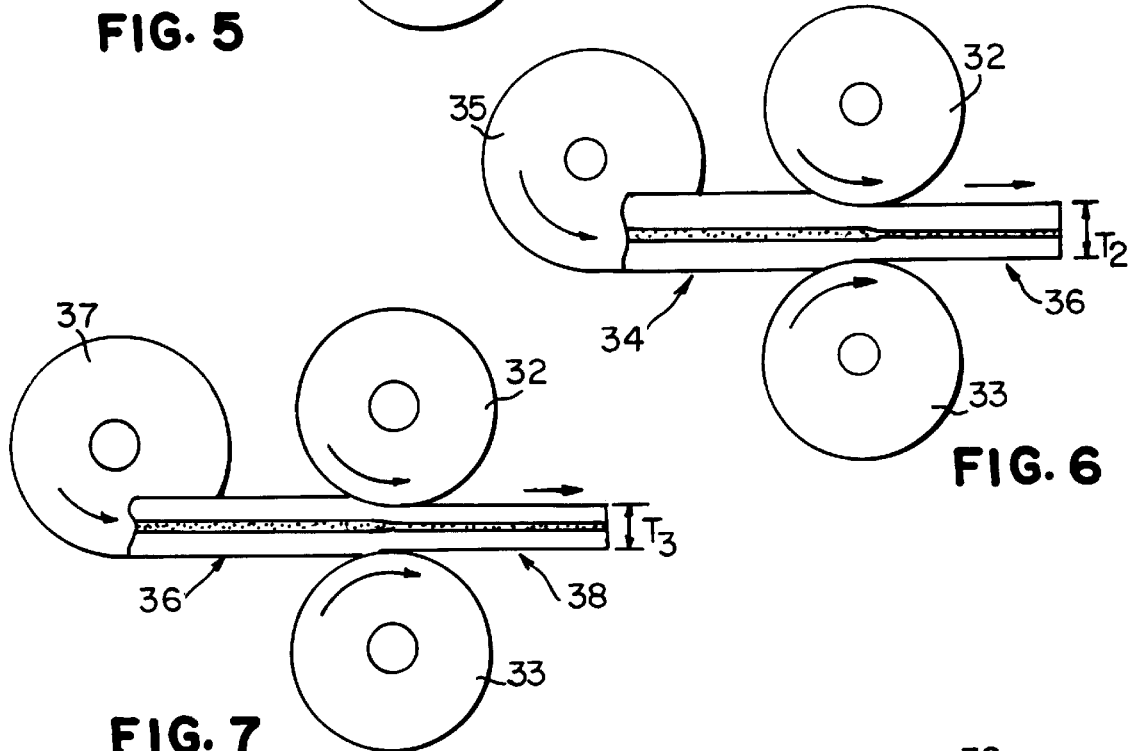
FIGS. 6–8 are views similar to FIG. 5, respectively illustrating the apparatus of FIG. 5 configured for second through fourth cold rolling passes.
Figure 7:
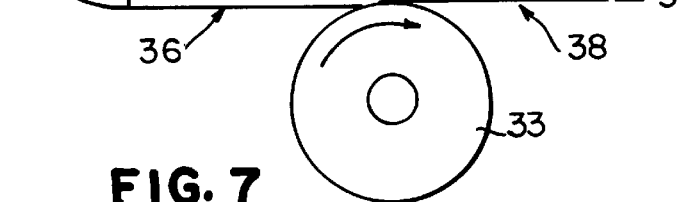
Figure 8:
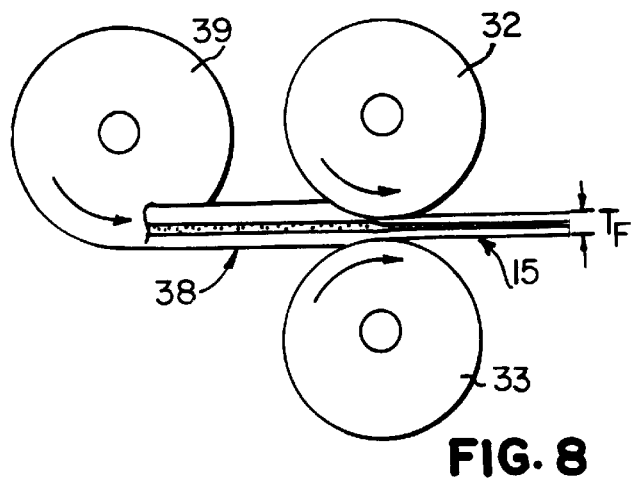

Instead of utilizing a consecutive series of roller sets, the method of the present invention could be formed by utilizing a single adjustable roller set. Thus, referring to FIGS. 5–8, there is illustrated a cold rolling assembly 30 including an adjustable roller set 31 comprising rollers 32 and 33, the distance between which can be selectively adjusted. Thus, it is possible to achieve a phased thickness reduction of the original laminate by passing it in successive passes through the roller set 31, with the rollers 32, 33 being successively closer together in each of the successive passes. Thus, referring to FIG. 5, the web 22 is initially fed from the coil 21 in a first pass to produce a reduced-thickness web 34 having a thickness $T_1$, which is then re-rolled into a coil 35. After the roller set 31 is adjusted, the web 34 is then again fed through it to produce a further reduced-thickness web 36 having a thickness $T_2$, as illustrated in FIG. 6, the web 36 then being re-rolled into a coil 37. In similar manner, the web 36 can then be passed through a further adjusted roller set 31 to produce a further reduced-thickness web 38 having a thickness $T_3$, which, after re-rolling into a coil 39, is again fed through the further adjusted roller set 31 to produce the final composite 15 having the thickness $T_F$.

In an example of the method of the present invention, a laminate sample, wherein the outer metal layers 11 and 12 were each 0.019-inch-thick cold rolled steel of extra deep draw quality (interstitial free) with a 0.001-inch viscoelastic layer 13 therebetween, was passed between two steel rollers. The rollers were approximately 4 inches in diameter with a variable distance between the rolls and applied a compressive pressure to the web sufficient to deform it, and preferably in a range of from about 30,000 to about 40,000 psi. The samples were cold reduced to thicknesses of 0.0285 inch, 0.0215 inch, 0.019 inch, 0.016 inch, 0.010 inch and 0.009 inch, respectively corresponding to 27%, 45%, 51%, 59%, 74% and 79% reductions.

It has been found that by the use of the method of the present invention, the thickness of the viscoelastic layer 13 can be reduced to as little as 0.1 mil. Despite this very small thickness, the viscoelastic layer in the resulting composite maintains its adhesive characteristics and noise-damping capability. Thus, it is possible with the use of the present invention to produce noise-damping composites with extremely thin viscoelastic layers, while permitting the original viscoelastic layer to be effectively applied in a continuous manner in an initial thickness which does not detract from its adhesive characteristics.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation.

The actual scope of the invention is intended to be defined in the following claims when viewed in their proper perspective based on the prior art.

We claim:

1. A method of forming a noise-damping composite comprising the steps of:

providing a laminate including two metal layers spaced apart by and joined by a viscoelastic layer with each layer having an initial thickness, and subjecting the laminate to compressive forces sufficient to permanently substantially reduce the initial thickness of each layer of the laminate to a final thickness, such that the viscoelastic layer has a final thickness which is in a range of from about 0.0001 to about 0.0007 inches.

2. The method of claim 1, wherein each of the metal layers has an initial thickness substantially greater than that of the viscoelastic layer.

3. The method of claim 1, wherein the initial thicknesses of the layers are substantially proportionally reduced.

4. The method of claim 1, wherein in the subjecting step the laminate is subjected to a pressure in excess of ten thousand pounds per square inch.

5. The method of claim 2, wherein each of the metal layers has an initial thickness 10 to 20 times that of the viscoelastic layer.

6. The method of claim 3, wherein the initial thickness of each layer is reduced at least twenty percent.

7. A method of forming a noise-damping composite comprising the steps of:

providing an elongated laminate including two metal layers spaced apart by and joined by a viscoelastic layer with each layer having an initial thickness, and cold rolling the laminate so as to exert thereon sufficient pressure to permanently substantially reduce the initial thickness of each layer of the laminate to a final thickness, such that the viscoelastic layer has a final thickness which is in a range of from about 0.0001 to about 0.0007 inches.

8. The method of claim 7, wherein in the cold rolling step the laminate is fed from a continuous supply between a pair of rollers.

9. The method of claim 7, wherein the cold rolling step includes passing the laminate successively through a series of pairs of rollers.

10. The method of claim 8, including adjusting the distance between the rollers.

11. The method of claim 10, wherein the cold rolling step includes feeding the laminate between the rollers in successive passes, and reducing the distance between the rollers between successive passes.

12. The method of claim 11, wherein in each pass the thickness of each layer is reduced approximately twenty percent.

13. The method of claim 9, wherein each pair of rollers reduces the thickness of each layer by approximately twenty percent.

14. A noise-damping laminate comprising:

two metal layers and a viscoelastic layer disposed between said metal layers in contact with each for joining the metal layers, said viscoelastic layer having a thickness approximately 0.1 mil.

15. The laminate of claim 14, wherein each of the metal layers has a thickness 10 to 20 times that of the viscoelastic layer.

* * * * *

UNITED STATES PATENT AND TRADEMARK OFFICE
CERTIFICATE OF CORRECTION

PATENT NO. : 6,202,462 B1
DATED : March 20, 2001
INVENTOR(S) : Richard M. Hansen et al.

It is certified that error appears in the above-identified patent and that said Letters Patent is hereby corrected as shown below:

Title page,
Item [56] References Cited, U.S. Patent Documents, add the following references cited:

```
-- 4,735,669*   4/1988      Guida et al.
   4,745,556*   5/1988      Turley
   3,852,983*   12/1974     Cook
   3,727,331*   4/1973      Morooka et al. --
```

Signed and Sealed this

Sixteenth Day of October, 2001

Attest:

Attesting Officer

NICHOLAS P. GODICI
Acting Director of the United States Patent and Trademark Office